(12) United States Patent
Nojima

(10) Patent No.: US 11,984,144 B2
(45) Date of Patent: May 14, 2024

(54) DISK DEVICE

(71) Applicants: Kabushiki Kaisha Toshiba, Tokyo (JP); Toshiba Electronic Devices & Storage Corporation, Tokyo (JP)

(72) Inventor: Yusuke Nojima, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 18/178,476

(22) Filed: Mar. 3, 2023

(65) Prior Publication Data
US 2024/0096354 A1 Mar. 21, 2024

(30) Foreign Application Priority Data
Sep. 15, 2022 (JP) .................. 2022-147086

(51) Int. Cl.
*G11B 5/48* (2006.01)
*G11B 5/596* (2006.01)

(52) U.S. Cl.
CPC .............. *G11B 5/483* (2015.09); *G11B 5/596* (2013.01)

(58) Field of Classification Search
CPC ... G11B 5/4873; G11B 5/4833; G11B 5/4853; G11B 5/4826; G11B 2220/2516; G11B 27/36; G11B 5/484; G11B 5/4813; G11B 5/483

USPC ....................................... 360/294.4
See application file for complete search history.

(56) References Cited

U.S. PATENT DOCUMENTS

| | | | |
|---|---|---|---|
| 7,701,675 B2 | 4/2010 | Yao et al. | |
| 8,995,094 B1 | 3/2015 | Chen et al. | |
| 9,047,896 B1 | 6/2015 | Kudo et al. | |
| 9,105,288 B1 | 8/2015 | Hahn et al. | |
| 9,190,086 B1 | 11/2015 | Ee et al. | |
| 10,468,057 B2 | 11/2019 | Naniwa et al. | |
| 10,916,265 B2 * | 2/2021 | Zhang | H10N 30/871 |

* cited by examiner

*Primary Examiner* — Nabil Z Hindi
(74) *Attorney, Agent, or Firm* — Kim & Stewart LLP (57) ABSTRACT

According to one embodiment, a disk device includes a magnetic head, a piezoelectric element and a flexure. The piezoelectric element includes two electrodes. The flexure includes a first part and a second part that swings. The first part has a first surface to which a first electrode is joined. The second part has a second surface to which the magnetic head is joined. The magnetic head has a third surface facing the first surface and the second surface. The first electrode is spaced apart from a second electrode in a first direction. The first surface and an end of the third surface face each other. The second surface and another end of the third surface face each other. A distance between the first surface and the one end of the third surface is longer than a distance between the second surface and the other end of the third surface.

13 Claims, 9 Drawing Sheets

FIG.8 under, ,US 11,984,144 B2

DISK DEVICE

CROSS-REFERENCE TO RELATED APPLICATIONS

This application is based upon and claims the benefit of priority from Japanese Patent Application No. 2022-147086, filed on Sep. 15, 2022, the entire contents of which are incorporated herein by reference.

FIELD

Embodiments described herein relate generally to a disk device.

BACKGROUND

Disk devices such as a hard disk drive include magnetic disks and magnetic heads that read and write information from and to the corresponding magnetic disks. Each magnetic head is mounted on a flexible flexure. A piezoelectric element is also attached to the flexure. The piezoelectric element adjusts the position of the magnetic head by deforming the flexure.

The piezoelectric element adjusts the position of the magnetic head with respect to the magnetic disk by swinging a part of the flexure on which the magnetic head is mounted. The swinging magnetic head may, however, contact with the flexure, which may cause difficulty in stably adjusting the position of the magnetic head.

DETAILED DESCRIPTION

In general, according to one embodiment, a disk device includes a magnetic disk, a magnetic head, a piezoelectric element and a flexure. The magnetic head is configured to read and write information from and to the magnetic disk. The piezoelectric element includes a first electrode and a second electrode spaced apart from the first electrode. The flexure includes a first part and a second part. The first electrode is joined to the first part. The magnetic head and the second electrode are joined to the second part. The second part swings with respect to the first part by deformation of the piezoelectric element which changes a distance between the first electrode and the second electrode. The first part has a first surface to which the first electrode is joined. The second part has a second surface to which the magnetic head is joined. The magnetic head has a third surface facing the first surface and the second surface. The first electrode is spaced apart from the second electrode in a first direction along the second surface. The first surface and an end of the third surface in the first direction face each other. The second surface and an end of the third surface in a second direction opposite to the first direction face each other. A distance between the first surface and the end of the third surface in the first direction is longer than a distance between the second surface and the end of the third surface in the second direction.

First Embodiment

Hereinafter, a first embodiment will be described with reference to FIGS. 1 to 3. Note that, in the present specification, components according to embodiments and descriptions of the components may be described in a plurality of expressions. The components and the descriptions thereof are examples, and are not limited by the expression of the present specification. The components may also be identified with names different from those herein. In addition, the component may be described by an expression different from the expression in the present specification.

Figure 1:
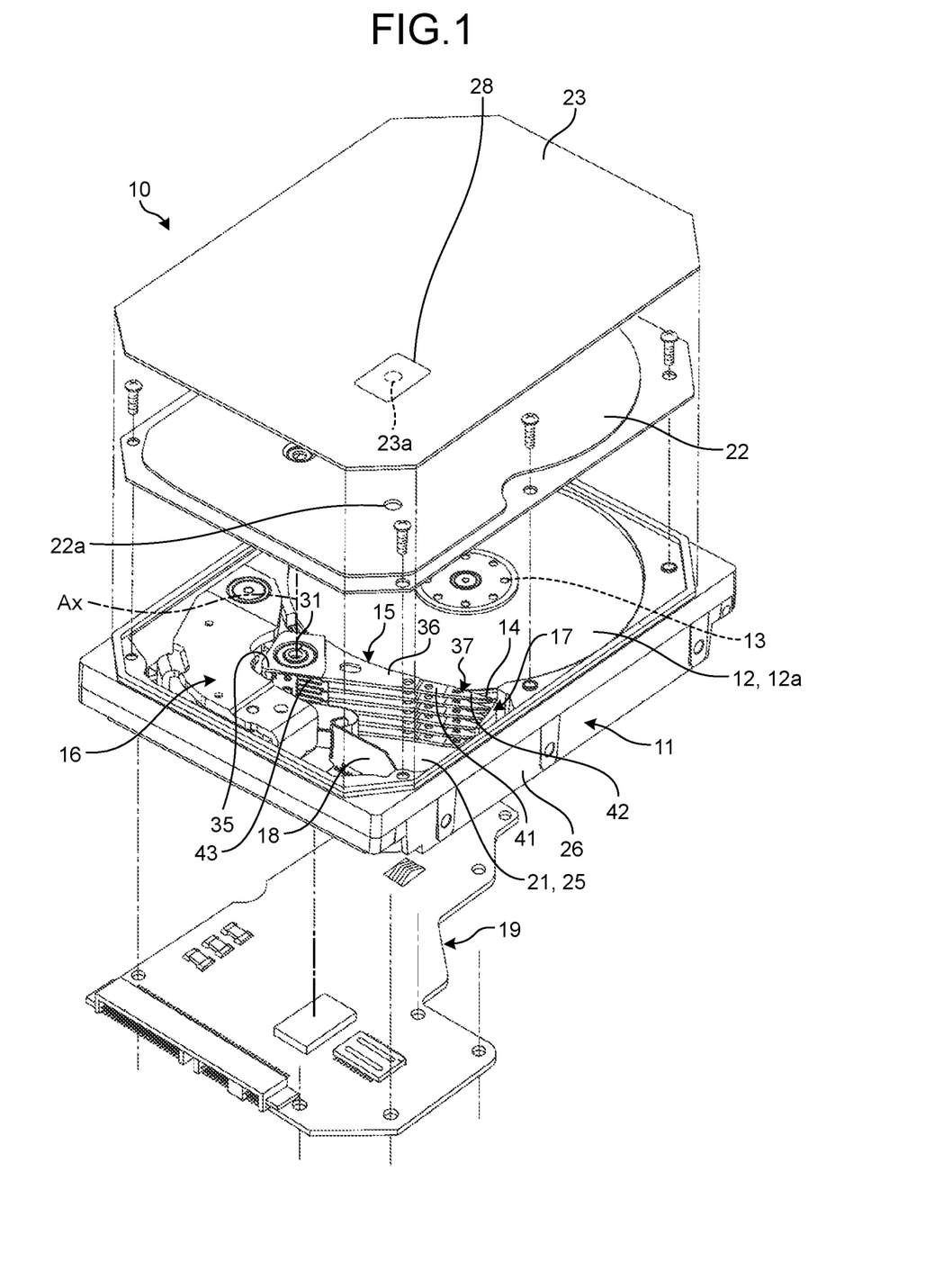
FIG. 1 is an exemplary perspective view illustrating an HDD according to a first embodiment in an exploded manner.

FIG. 1 is an exemplary perspective view illustrating a hard disk drive (HDD) 10 according to the first embodiment in an exploded manner. The HDD 10 is an example of a disk device, and may also be referred to as an electronic device, a storage device, an external storage device, or a magnetic disk device.

The HDD 10 includes a housing 11, a plurality of magnetic disks 12, a spindle motor 13, a plurality of magnetic heads 14, a head stack assembly (HSA) 15, a voice coil motor (VCM) 16, a ramp load mechanism 17, a flexible printed circuit board (FPC) 18, and a printed circuit board (PCB) 19. The VCM 16 is an example of an actuator.

The housing 11 includes a base 21, an inner cover 22, and an outer cover 23. The base 21 is a bottomed container and has a bottom wall 25 and a side wall 26. The bottom wall 25 has a substantially rectangular (quadrangular) plate shape. The side wall 26 protrudes from an edge of the bottom wall 25.

The inner cover 22 is attached to an end of the side wall 26 with, for example, screws. The outer cover 23 covers the inner cover 22 and is airtightly fixed to the end of the side wall 26 by welding, for example.

The inside of the housing 11 is sealed. The magnetic disk 12, the spindle motor 13, the magnetic head 14, the HSA 15, the VCM 16, the ramp load mechanism 17, and the FPC 18 are disposed inside the housing 11.

The inner cover 22 is provided with a vent 22a. Further, the outer cover 23 is provided with a vent 23a. After the components are attached to the inside of the base 21 and the inner cover 22 and the outer cover 23 are attached to the base 21, the air inside the housing 11 is removed from the vents 22a and 23a. Furthermore, the housing 11 is filled with a gas different from air.

The gas filled in the housing 11 is, for example, a low density gas having a density lower than that of air, an inert gas having low reactivity, or the like. For example, helium is filled inside the housing 11. Note that another fluid may be filled inside the housing 11. Further, the inside of the housing 11 may be maintained at vacuum, low pressure close to vacuum, or negative pressure lower than atmospheric pressure.

The vent 23a of the outer cover 23 is closed by a seal 28. The seal 28 airtightly seals the vent 23a and prevents the fluid filled in the housing 11 from leaking from the vent 23a.

The magnetic disk 12 is, for example, a disk-shaped recording medium having a magnetic recording layer provided on a recording surface 12a such as an upper surface and a lower surface. The diameter of the magnetic disk 12 in the example of FIG. 1 is, for example, 3.5 inches, but is not limited to this example.

The spindle motor 13 supports and rotates a plurality of magnetic disks 12 stacked at intervals in the direction in which the recording surface 12a faces. The plurality of magnetic disks 12 is held by the hub of the spindle motor 13 by, for example, a clamp spring.

The magnetic head 14 includes, for example, a slider and a head element. The head element of the magnetic head 14 records and reproduces information on and from the recording layer of the magnetic disk 12. In other words, the magnetic head 14 reads and writes information from and to the magnetic disk 12. The magnetic head 14 is mounted on the HSA 15.

The HSA 15 is supported by a support shaft 31 away from the magnetic disk 12. The HSA 15 is rotatable about an axis Ax of the support shaft 31. The axis Ax is an example of a rotation axis. The HSA 15 includes an actuator block 35, a plurality of arms 36, and a plurality of head gimbal assemblies (HGA) 37.

The actuator block 35 is supported by the support shaft 31 via a bearing, for example. The plurality of arms 36 protrude from the actuator block 35 in a direction substantially orthogonal to the axis Ax. The actuator block 35 and the plurality of arms 36 are integrally formed, for example.

The plurality of arms 36 are arranged at intervals in the direction along the axis Ax. Each of the arms 36 has a plate shape to enter between the adjacent magnetic disks 12. The plurality of arms 36 extend substantially in parallel.

A voice coil of the VCM 16 is provided on a protrusion protruding from the actuator block 35 to the opposite side of the arm 36. The VCM 16 includes, for example, a pair of yokes, a voice coil disposed between the yokes, and a magnet provided on the yoke.

The VCM 16 rotates the HSA 15 about the axis Ax. Specifically, the VCM 16 integrally rotates (moves) the actuator block 35, the arm 36, and the HGA 37. The VCM 16 rotates the HSA 15 to a desired position. The ramp load mechanism 17 holds the magnetic head 14 when moved to the outermost periphery of the magnetic disk 12 at an unload position away from the magnetic disk 12.

The HGA 37 is attached to a distal end of the corresponding arm 36 and protrudes from the arm 36. As a result, the plurality of HGAs 37 are arranged at intervals in the direction along the axis Ax. Each of the plurality of HGAs 37 includes a base plate 41, a load beam 42, and a flexure 43.

The base plate 41 and the load beam 42 are made of, for example, stainless steel. Note that the materials of the base plate 41 and the load beam 42 are not limited to this example. The base plate 41 is attached to the distal end of the arm 36. The load beam 42 has a plate shape thinner than the base plate 41. The load beam 42 is attached to the distal end of the base plate 41 and protrudes from the base plate 41.

Figure 2:
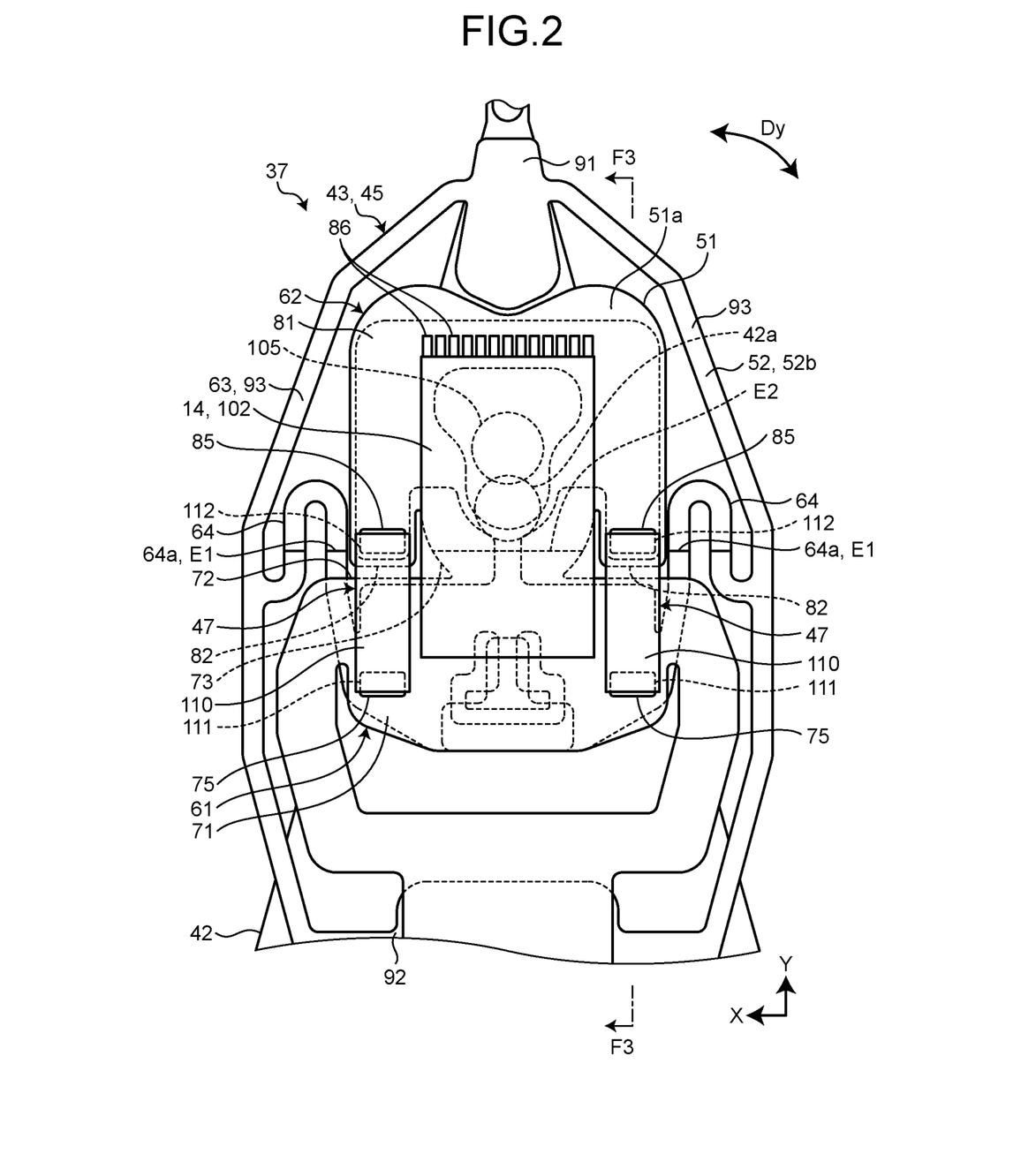
FIG. 2 is an exemplary plan view illustrating a part of an HGA of the first embodiment.

FIG. 2 is an exemplary plan view illustrating a part of the HGA 37 of the first embodiment. FIG. 3 is an exemplary cross-sectional view illustrating a part of the HGA 37 of the first embodiment taken along line F3-F3 of FIG. 2.

As illustrated in the drawings, in the present specification, an X axis, a Y axis, and a Z axis are defined for convenience. The X axis, the Y axis, and the Z axis are orthogonal to each other. The X axis is provided along the width of the HGA 37. The Y axis is provided along the length of the HGA 37. The Z axis is provided along the thickness of the HGA 37.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

For example, the Y direction is a direction substantially orthogonal to the axis Ax. The arm 36 extends from the actuator block 35 in the +Y direction. The HGA 37 extends in the +Y direction from the end of the arm 36 in the +Y direction. That is, the Y direction is also the longitudinal direction of the arm 36 and the HGA 37. For example, the Z direction is a direction along the axis Ax.

The magnetic head 14 is disposed at an end of the HGA 37 in the +Y direction. The end of the HGA 37 in the −Y direction is attached to the arm 36. In the present specification, the end includes not only an end of the element but also an area in the vicinity of the end.

The flexure 43 is a flexible multi-layer substrate provided with wiring, and has an elongated strip shape. Note that the shape of the flexure 43 is not limited to this example. The flexure 43 includes a gimbal 45 (elastic support).

The gimbal 45 is provided at an end of the flexure 43 in the +Y direction. In addition, the gimbal 45 is located at an end of the HGA 37 in the +Y direction. The gimbal 45 is attached to the load beam 42 and is displaceable relative to the load beam 42. The magnetic head 14 is mounted on the gimbal 45.

An end of the flexure 43 in the −Y direction is connected to the FPC 18 on the actuator block 35, for example. As a result, the FPC 18 is electrically connected to the magnetic head 14 via the wiring of the flexure 43.

The HGA 37 further includes a pair of microactuators (MA) 47. The MA 47 is an example of a piezoelectric element. The MA 47 is, for example, a bulk piezoelectric element. Further, the MA 47 may be a bulk-stack or thin-film piezoelectric element. The MA 47 is not limited to this example.

The MA 47 is mounted on the gimbal 45. The pair of MAs 47 is disposed apart from each other in the X direction. In the X direction, the magnetic head 14 is located between the pair of MAs 47. The MA 47 can expand and contract in a substantially Y direction according to an applied voltage. The pair of MAs 47 individually expand and contract to deform the gimbal 45. As a result, the MA 47 moves the magnetic head 14 mounted on the gimbal 45.

The HGA 37 further includes, for example, another pair of MAs connecting the base plate 41 and the load beam 42. The pair of MAs elastically bends the load beam 42 by individually expanding and contracting, and moves the magnetic head 14.

As described above, the HDD 10 according to the present embodiment adjusts the position of the magnetic head 14 by a so-called triple stage actuator (TSA) method in which the magnetic head 14 is moved by the VCM 16, the MA 47, and the MA between the base plate 41 and the load beam 42.

The PCB 19 illustrated in FIG. 1 is, for example, a rigid board such as a glass epoxy board, and is a multilayer board, a build-up board, or the like. The PCB 19 is disposed outside the housing 11 and is attached to the bottom wall 25 of the base 21.

Various electronic components such as a relay connector connected to the FPC 18, an interface (I/F) connector connected to the host computer, and a controller that controls the operation of the HDD 10 are mounted on the PCB 19. The relay connector is electrically connected to the FPC 18 via a connector provided on the bottom wall 25.

Hereinafter, the HGA 37 will be described in detail. As illustrated in FIG. 3, the flexure 43 includes a wiring layer 51 and a backing layer 52. The wiring layer 51 and the backing layer 52 are attached to each other by, for example, an adhesive.

The wiring layer 51 includes, for example, a base layer, a conductive layer, and a cover layer. The base layer and the cover layer are made of an insulator such as polyimide (PI). The conductive layer is made of metal such as copper, for example, and forms various patterns such as wiring and pads on the base layer. The cover layer covers at least a part of the base layer and the conductive layer. For example, the cover layer covers the wiring of the conductive layer. In addition, the cover layer exposes the pad of the conductive layer to the outside of the wiring layer 51 through a hole or a cutout provided in the cover layer.

The wiring layer 51 has two surfaces 51a and 51b. The surface 51a faces approximately in the −Z direction. The surface 51b is opposite the surface 51a and faces approximately in the +Z direction. In the present embodiment, part of the surfaces 51a and 51b faces a direction inclined with respect to the Z direction.

The surface 51a includes, for example, the cover layer of the wiring layer 51, a pad of a metal layer exposed by the hole of the cover layer, and the base layer exposed by the hole of the cover layer. The surface 51b is formed of, for example, a base layer of the wiring layer 51. The magnetic head 14 and the MA 47 are mounted on the surface 51a. When the magnetic head 14 is positioned on the magnetic disk 12, the surface 51a faces the recording surface 12a. The surface 51b faces the backing layer 52. Note that the surfaces 51a and 51b are not limited to this example.

The backing layer 52 is, for example, a metal plate made of metal such as stainless steel. The backing layer 52 has two surfaces 52a and 52b. The surface 52a faces approximately in the +Z direction. The surface 52b is opposite the surface 52a and faces approximately in the −Z direction. In the present embodiment, part of the surfaces 52a and 52b faces a direction inclined with respect to the Z direction.

The surface 52a faces the load beam 42. The surface 52b faces the surface 51b of the wiring layer 51. The surface 51b of the wiring layer 51 and the surface 52b of the backing layer 52 are attached to each other by, for example, an adhesive.

As illustrated in FIG. 2, the gimbal 45 includes a base 61, a movable part 62, an annular part 63, and a pair of connections 64. The base 61 is an example of a first part. The movable part 62 is an example of a second part.

Each of the base 61, the movable part 62, the annular part 63, and the connections 64 may include a part of the wiring layer 51 and a part of the backing layer 52. Note that, for example, the annular part 63 and the connections 64 may include only the backing layer 52 between the wiring layer 51 and the backing layer 52.

The base 61 has a mounting surface 71, a front edge 72, and a flexible part 73. The mounting surface 71 is an example of a first surface. The front edge 72 is an example of a first edge.

The mounting surface 71 is included in the surface 51a of the wiring layer 51. The mounting surface 71 has a pair of pads 75. The pads 75 are on the metal layer of the wiring layer 51. FIG. 3 illustrates the pad 75 on the mounting surface 71 for simplicity. However, the pad 75 is exposed by, for example, the hole in the cover layer of the wiring layer 51. As illustrated in FIG. 2, the pair of pads 75 is separated from each other in the X direction, for example.

The front edge 72 is provided, for example, at an end of the base 61 in the +Y direction. In the present embodiment, the front edge 72 is provided in the wiring layer 51 of the base 61. The front edge 72 extends substantially in the X direction and faces substantially in the +Y direction. Note that the front edge 72 is not limited to this example.

The flexible part 73 extends in the +Y direction from substantially the center of the front edge 72 in the X direction. That is, the length (width) of the flexible part 73 in the X direction is shorter than the entire length (width) of the base 61 in the X direction. The flexible part 73 is connected to the movable part 62. Note that the movable part 62 may be separated from the base 61.

Due to a thin thickness, the flexible part 73 is easily elastically deformable. The movable part 62 can swing with respect to the base 61 by the elastic deformation of the flexible part 73. For example, the movable part 62 can swing in the yawing direction Dy with respect to the base 61 as illustrated in FIG. 2. The yawing direction Dy is, for example, a rotational direction around the Z axis. Note that the movable part 62 may be swingable in a rolling direction around the Y axis and a pitching direction around the X axis with respect to the base 61.

The movable part 62 is supported by, for example, a substantially hemispherical protrusion 42a provided on the load beam 42. The protrusion 42a is in contact with the surface 52a of the backing layer 52 of the movable part 62. As a result, the movable part 62 can swing in the yawing direction Dy, the rolling direction, and the pitching direction.

The movable part 62 has a mounting surface 81 and a pair of rear edges 82. The mounting surface 81 is an example of a second surface. The rear edge 82 is an example of a second edge. The mounting surface 81 is included in the surface 51a of the wiring layer 51.

In the present embodiment, the mounting surface 81 is a substantially flat surface extending along the X-Y plane. The X direction and the Y direction are thus directions along the mounting surface 81. The −Y direction along the mounting surface 81 is an example of a first direction. The +Y direction along the mounting surface 81 is an example of a second direction.

For example, the movable part 62 including the mounting surface 81 may swing by the gimbal 45 being displaced. In this case, the first direction and the second direction may be directions different from the direction orthogonal to the axis Ax according to the swing of the mounting surface 81.

The mounting surface 81 includes a pair of pads 85 and a plurality of pads 86. The pads 85 and 86 are the pads of the metal layer of the wiring layer 51. FIG. 3 illustrates the pads 85 and 86 on the mounting surface 81 for simplicity. However, the pads 85 and 86 are exposed by, for example, the hole provided in the cover layer of the wiring layer 51.

As illustrated in FIG. 2, the pair of pads 85 is separated from each other in the X direction, for example. The distance between the pair of pads 85 is substantially equal to the distance between the pair of pads 75. One of the pair of pads 85 and the corresponding one of the pair of pads 75 are arranged at an interval in the substantially Y direction.

The plurality of pads 86 are separated from the pair of pads 85 in the +Y direction. The plurality of pads 86 are arranged at intervals in the X direction. As illustrated in FIG. 3, terminals of the magnetic head 14 are joined to the plurality of pads 86 with, for example, solder 88. That is, the magnetic head 14 is joined to the mounting surface 81 of the movable part 62.

As illustrated in FIG. 2, the pair of rear edges 82 is provided, for example, at an end of the movable part 62 in the −Y direction. In the present embodiment, the rear edge 82 is provided in the wiring layer 51 of the movable part 62. The pair of rear edges 82 is separated from each other in the substantially X direction. The movable part 62 is connected to the flexible part 73 of the base 61 at the portion between the pair of rear edges 82 in the X direction.

The rear edge 82 extends substantially in the X direction and faces substantially in the −Y direction. The pair of rear edges 82 is spaced apart from the front edge 72 of the base 61 in the +Y direction. That is, there is a gap between the front edge 72 of the base 61 and the rear edge 82 of the movable part 62.

The annular part 63 has a substantially elliptical or substantially polygonal annular shape surrounding the base 61 and the movable part 62. Note that the shape of the annular part 63 is not limited to this example. The annular part 63 includes a front attachment part 91, a rear attachment part 92, and a pair of bridges 93.

The front attachment part 91 is separated in the +Y direction from the movable part 62 in the Y direction. The backing layer 52 of the front attachment part 91 is attached to the load beam 42 by welding, for example. The rear attachment part 92 is separated in the −Y direction from the base 61 in the Y direction. The backing layer 52 of the rear attachment part 92 is attached to the load beam 42 by welding, for example. In the Y direction, the base 61 and the movable part 62 are positioned between the front attachment part 91 and the rear attachment part 92.

The pair of bridges 93 connects, for example, both ends of the front attachment part 91 in the X direction and both ends of the rear attachment part 92 in the X direction. In the X direction, the base 61 and the movable part 62 are positioned between the pair of bridges 93.

Each of the pair of connections 64 connects the corresponding one of the pair of bridges 93 and the base 61. The pair of connections 64 has, for example, a meandering belt shape. Note that the shape of the connections 64 is not limited to this example.

The base 61 is swingable with respect to the annular part 63 by the elastic deformation of the connections 64. That is, the connections 64 connect the annular part 63 and the base 61 such that the base 61 is swingable with respect to the annular part 63.

Figure 3:
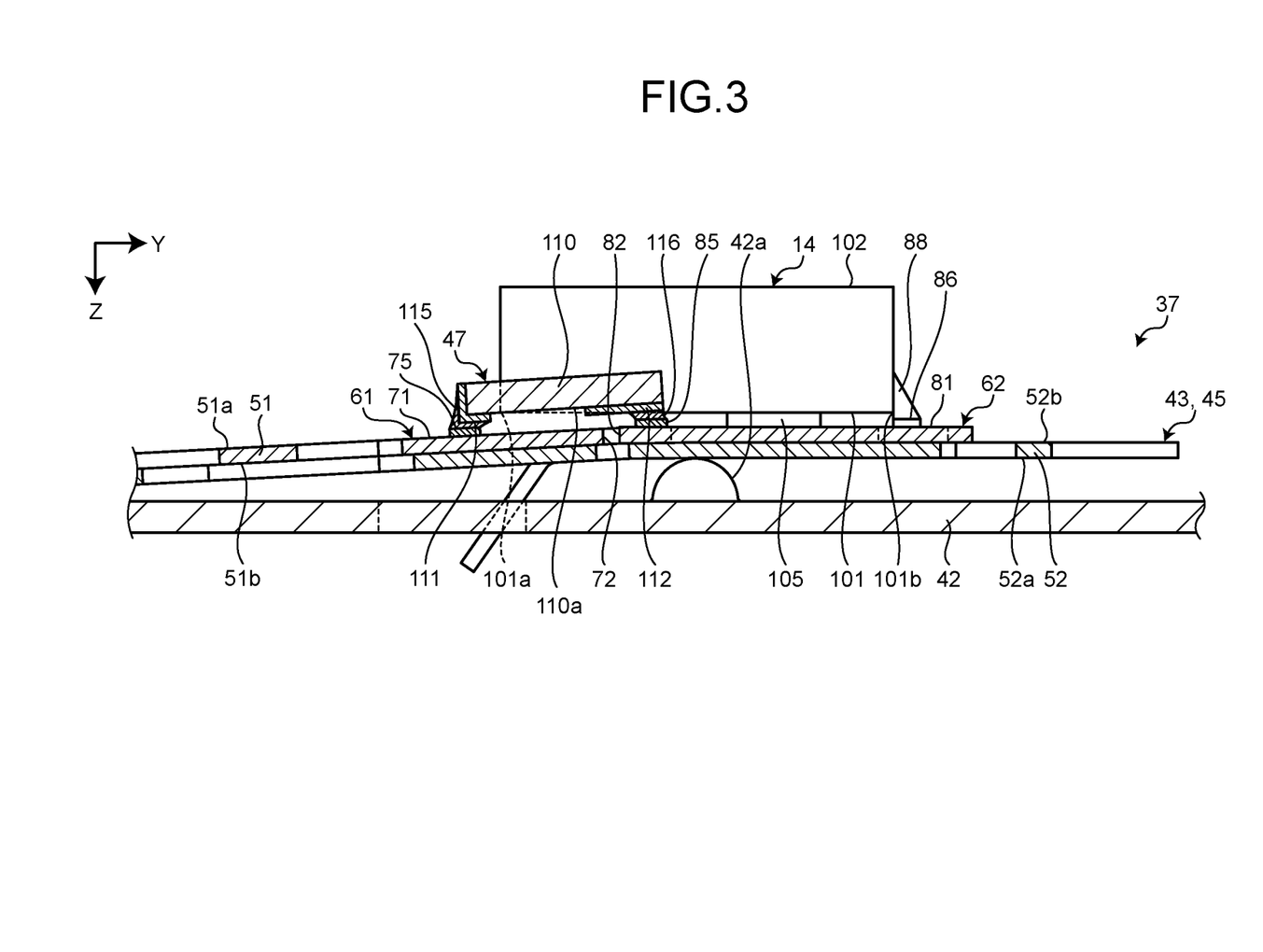
FIG. 3 is an exemplary cross-sectional view illustrating a part of the HGA of the first embodiment taken along line F3-F3 of FIG. 2.

As illustrated in FIG. 3, the slider of the magnetic head 14 has an attachment surface 101 and a bottom surface 102. The attachment surface 101 is an example of a third surface. The attachment surface 101 is a substantially flat surface along the X-Y plane and faces substantially in the +Z direction. The bottom surface 102 is opposite the attachment surface 101 and faces substantially in the −Z direction. The bottom surface 102 faces the recording surface 12a when the magnetic head 14 is located on the magnetic disk 12.

The attachment surface 101 faces the mounting surface 71 of the base 61 and the mounting surface 81 of the movable part 62. The mounting surface 71 faces an end 101a of the attachment surface 101 in the −Y direction. The mounting surface 81 faces an end 101b of the attachment surface 101 in the +Y direction.

The end 101a is closer to the axis Ax than the end 101b. While the magnetic head 14 is located on the magnetic disk 12, the airflow caused by the rotation of the magnetic disk 12 flows into a gap between the recording surface 12a of the magnetic disk 12 and the end of the bottom surface 102 of the magnetic head 14 in the −Y direction. The airflow flows out from a gap between the end of the bottom surface 102 and the recording surface 12a in the +Y direction. The end 101a of the attachment surface 101 in the −Y direction can be referred to as an inflow end of the attachment surface 101. The end 101b may be referred to as an outflow end of the attachment surface 101. The airflow causes the magnetic head 14 to float from the recording surface 12a.

The attachment surface 101 is attached to the mounting surface 81 by, for example, an adhesive 105. Therefore, when the movable part 62 swings with respect to the base 61, the magnetic head 14 also swings with respect to the base 61. The attachment surface 101 of the magnetic head 14 and the mounting surface 81 of the movable part 62 are disposed substantially parallel to each other.

Each of the pair of MAs 47 includes a piezoelectric element 110, a first electrode 111, and a second electrode 112. The piezoelectric element 110 has a substantially rectangular parallelepiped shape extending in substantially the Y direction. The piezoelectric element 110 has an attachment surface 110a. The attachment surface 110a faces the mounting surface 71 of the base 61 and the mounting surface 81 of the movable part 62.

The first electrode 111 is provided, for example, at an end of the attachment surface 110a in the −Y direction. The second electrode 112 is provided, for example, at an end of the attachment surface 110a in the +Y direction. That is, the first electrode 111 is separated in the −Y direction from the second electrode 112 in the Y direction. Note that the first electrode 111 and the second electrode 112 may be provided at other positions of the piezoelectric element 110.

The first electrode 111 is joined to the pad 75 of the mounting surface 71 of the base 61, for example, with a conductive adhesive 115. The second electrode 112 is joined to the pad 85 of the mounting surface 81 of the movable part 62, for example, with a conductive adhesive 116.

The adhesive 115 and 116 are, for example, an epoxy-based adhesive mixed with a conductive filler such as silver. Note that the first electrode 111 and the second electrode 112 may be joined to the pads 75 and 85 with, for example, solder instead of the adhesive 115 and 116.

As illustrated in FIG. 2, the flexible part 73 of the base 61 is located in-between the pair of MAs 47 in the X direction. The MAs 47 extend across the front edge 72 of the base 61 and the rear edge 82 of the movable part 62. The MAs 47 cover the gap between the front edge 72 and the rear edge 82.

By applying a voltage to the first electrode 111 or the second electrode 112, the piezoelectric element 110 expands and contracts substantially in the Y direction. This changes the distance between the first electrode 111 joined to the pad 75 and the second electrode 112 joined to the pad 85.

For example, by extension of one of the MAs 47 and contraction of the other, the movable part 62 swings in the yawing direction Dy with respect to the base 61. In this manner, the MAs 47 are each deformed so as to change the distance between the first electrode 111 and the second electrode 112, causing the movable part 62 to swing with respect to the base 61.

As illustrated in FIG. 3, the base 61 is bent with respect to the movable part 62. As a result, the mounting surface 71 of the base 61 is inclined with respect to the mounting surface 81 of the movable part 62 in-between the pad 75 and the movable part 62 and in the pad 75 such that the mounting surface 71 extends further away from the attachment surface 101 of the magnetic head 14 as extending further away from the movable part 62. In other words, the base 61 is bent with respect to the movable part 62 such that the mounting surface 71 is inclined with respect to the mounting surface 81.

The base 61 bent with respect to the movable part 62 extends from the movable part 62 so as to approach the load beam 42 as being away from the movable part 62. However, the base 61 is separated from the load beam 42.

Due to the inclination of the mounting surface 71 with respect to the mounting surface 81, the distance between the mounting surface 71 and the end 101a of the attachment surface 101 is longer than the distance between the mounting surface 81 and the end 101b of the attachment surface 101. That is, the mounting surface 71 faces the attachment surface 101 with a longer interval than the interval between the mounting surface 81 and the attachment surface 101.

The surface 52b of the backing layer 52 included in the base 61 faces the end 101a of the attachment surface 101 via, for example, the wiring layer 51. The surface 52b of the backing layer 52 included in the movable part 62 faces the end 101b of the attachment surface 101 via, for example, the wiring layer 51. The distance between the end 101a of the attachment surface 101 and the surface 52b of the backing layer 52 included in the base 61 is longer than the distance between the end 101b of the attachment surface 101 and the surface 52b of the backing layer 52 included in the movable part 62.

In the HDD 10 according to the present embodiment, first, the VCM 16 rotates the HSA 15 about the axis Ax to bring the magnetic head 14 close to a desired position. The VCM 16 rotates the HSA 15 to rotate the base plate 41, the load beam 42, and the flexure 43 of the HSA 15 and the magnetic head 14 about the axis Ax.

When the magnetic head 14 reaches near the desired position, the MA between the base plate 41 and the load beam 42 bends the load beam 42 and brings the magnetic head 14 closer to the desired position. In addition, the MA 47 expands and contracts to swing the magnetic head 14 and the movable part 62 in the yawing direction Dy, and adjusts the position of the magnetic head 14. Note that the movement of the magnetic head 14 is not limited to the above example.

As the magnetic head 14 and the movable part 62 swing in the yawing direction Dy, the end 101b of the attachment surface 101 facing the mounting surface 81 swings together with the mounting surface 81 in the yawing direction Dy. That is, the relative position between the end 101b and the mounting surface 81 remains nearly unchanged. On the other hand, the end 101a of the attachment surface 101 facing the mounting surface 71 swings in the yawing direction Dy with respect to the mounting surface 71.

The contact between the end 101a of the attachment surface 101 and the mounting surface 71 may hinder the magnetic head 14 and the movable part 62 from swinging, for example, because of friction. However, the mounting surface 71 of the present embodiment is sufficiently away from the end 101a of the attachment surface 101, therefore, it can be avoided from contacting with the end 101a.

As illustrated in FIG. 3, due to the inclination of the mounting surface 71 with respect to the mounting surface 81, the pad 75 and the pad 85 are at different positions in the Z direction. As a result, the MA 47 is disposed with the attachment surface 110a inclined with respect to the mounting surface 81.

As illustrated in FIG. 2, each of the pair of connections 64 includes a curved part 64a. An edge E1 of the curved part 64a extends substantially in the X direction. The edge E1 is a boundary (corner) between two adjacent, mutually inclined surfaces in the curved part 64a of the connection 64.

An edge E2 of a bend between the base 61 and the movable part 62 also extends in the substantially X direction. The edge E2 of the bend between the base 61 and the movable part 62 is located on the extension line of the edge E1 of the curved part 64a. That is, in the Y direction, the edge E2 of the bend between the base 61 and the movable part 62 and the edge E1 of the curved part 64a are located at substantially the same position.

In the HDD 10 according to the first embodiment described above, the flexure 43 includes the base 61 and the movable part 62. The first electrode 111 of the MA 47 is joined to the mounting surface 71 of the base 61. The second electrode 112 of the MA 47 is joined to the movable part 62. The MA 47 is deformed so as to change the distance between the first electrode 111 and the second electrode 112, which causes the movable part 62 to swing with respect to the base 61. The magnetic head 14 is joined to the mounting surface 81 of the movable part 62. The magnetic head 14 has the attachment surface 101 facing the mounting surface 71 and the mounting surface 81. In the −Y direction along the mounting surface 81, the first electrode 111 is spaced apart from the second electrode 112. The mounting surface 71 and the end 101a of the attachment surface 101 in the −Y direction face each other. The mounting surface 81 and the end 101b of the attachment surface 101 in the +Y direction face each other. The distance between the mounting surface 71 and the end 101a is longer than the distance between the mounting surface 81 and the end 101b. Namely, there is a gap between the mounting surface 71 of the base 61 and the attachment surface 101 of the magnetic head 14. According to the HDD 10, due to the gap the magnetic head 14 can be prevented from contacting the mounting surface 71, when swinging with respect to the base 61 along with the movable part 62 to which the magnetic head 14 is joined. This makes it possible to avoid lowering the steadiness of positioning the magnetic head 14 with respect to the magnetic disk 12.

The mounting surface 71 includes the pad 75 to which the first electrode 111 is joined. Of the mounting surface 71, at least the part between the pad 75 and the movable part 62 is inclined with respect to the mounting surface 81 such that the part extends further away from the attachment surface 101 as extending further away from the movable part 62. Such an inclination creates a gap between the mounting surface 71 and the attachment surface 101 in the area between the pad 75 and the movable part 62. According to the HDD 10, thus, the magnetic head 14 can be prevented from contacting the mounting surface 71, when swinging with respect to the base 61 along with the movable part 62. This makes it possible to avoid lowering the steadiness of positioning the magnetic head 14 with respect to the magnetic disk 12.

The mounting surface 71 is inclined with respect to the mounting surface 81 in-between the pad 75 and the movable part 62 and in the pad 75 such that the mounting surface 71 extends further away from the attachment surface 101 as extending further away from the movable part 62. Thus, as the distance from the movable part 62 increases, the gap between the mounting surface 71 and the attachment surface 101 increases. According to the HDD 10, due to such a gap, the magnetic head 14 can be prevented from contacting the mounting surface 71, when swinging with respect to the base 61 along with the movable part 62. This makes it possible to avoid lowering the steadiness of positioning the magnetic head 14 with respect to the magnetic disk 12.

The base 61 is bent with respect to the movable part 62 such that the mounting surface 71 is inclined with respect to the mounting surface 81. Thus, the mounting surface 71 inclined with respect to the mounting surface 81 can be easily formed.

The flexure 43 includes the annular part 63 and the connection 64. The annular part 63 surrounds the base 61 and the movable part 62. The connection 64 connects the annular part 63 and the base 61 in a manner that the base 61 is swingable with respect to the annular part 63. The connection 64 includes the curved part 64a. The edge E2 of the bend between the base 61 and the movable part 62 is located on the extension line of the edge E1 of the curved part 64a. That is, the corner between the base 61 and the movable part 62 is bent at substantially the same position as the curved part 64a. As a result, the flexure 43 can prevent the connection 64 from applying, to the base 61, an elastic force that causes the bent base 61 and the movable part 62 to turn into a straight form.

The second electrode 112 is joined to the mounting surface 81. The MA 47 has the attachment surface 110a on which the first electrode 111 and the second electrode 112 are mounted. The attachment surface 110a is inclined with respect to the mounting surface 81. This results in eliminating the necessity to incline the joined part of the movable part 62 with the second electrode 112, leading to facilitating the manufacture of the flexure 43.

The movable part 62 is connected to the base 61 in a swingable manner with respect to the base 61. The base 61 has the front edge 72. The movable part 62 has the rear edge 82 away from the front edge 72 in the +Y direction along the mounting surface 81. The MA 47 extends across the front edge 72 and the rear edge 82. As compared with the mutually separated base 61 and movable part 62, it is easier to join the MA 47 to the mutually connected base 61 and movable part 62. In addition, the flexure 43 is provided with a cutout or a hole so as to separately form the front edge 72 and the rear edge 82. This results in narrowing the width of the connected part (flexible part 73) between the base 61 and the movable part 62, which allows the movable part 62 to be easily swingable with respect to the base 61.

The VCM 16 rotates the flexure 43 about the axis Ax. The −Y directional end 101a of the attachment surface 101 is closer to the axis Ax than the +Y directional end 101b of the attachment surface 101. In other words, the end 101a is located at the inflow end where the airflow flows into the gap between the magnetic disk 12 and the magnetic head 14. The HDD 10 enables improvement in accuracy of positioning the magnetic head 14 with respect to the magnetic disk 12 by swinging the inflow end.

Second Embodiment

Hereinafter, a second embodiment will be described with reference to FIGS. 4 and 5. In the following description of the plurality of embodiments, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 4:
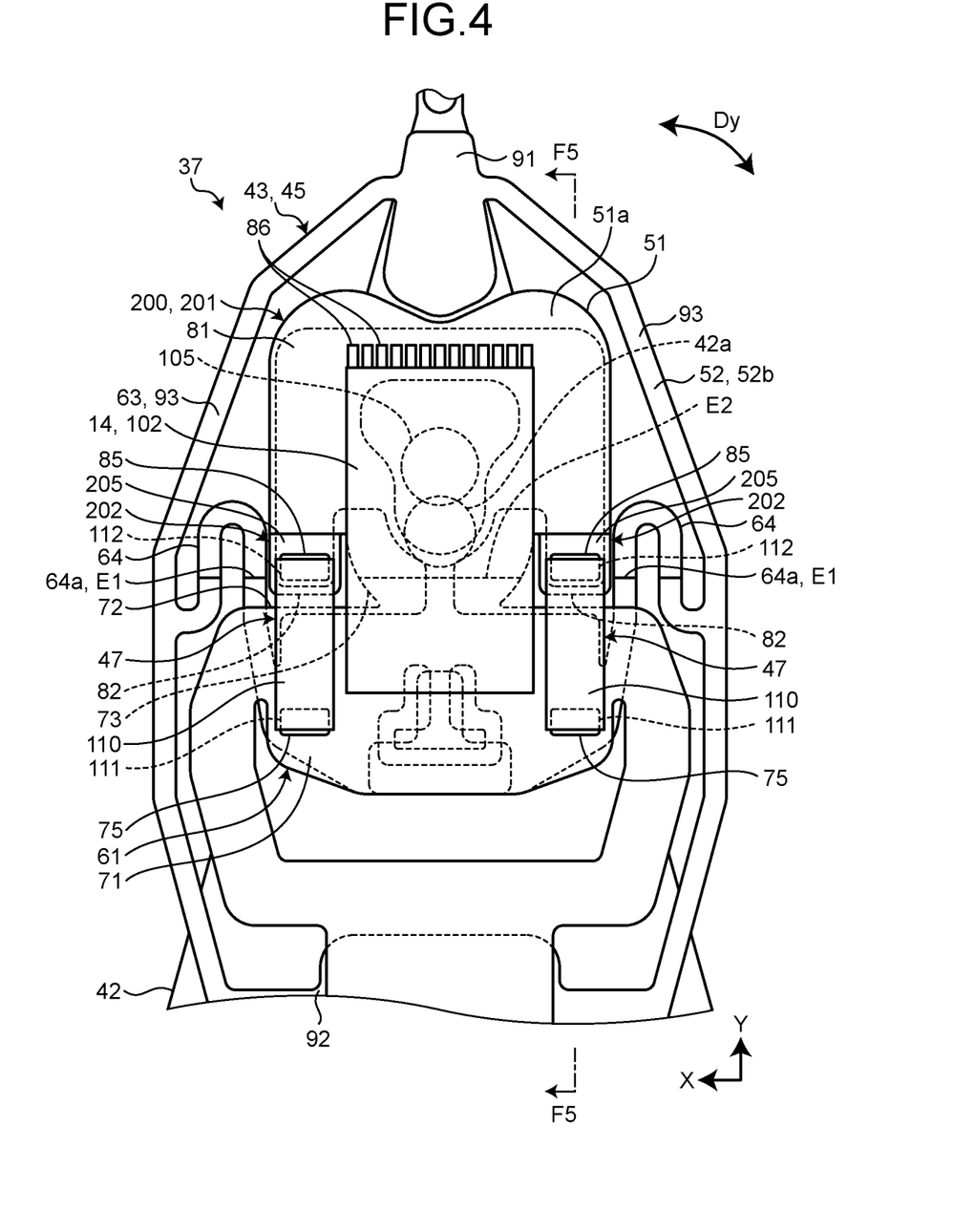
FIG. 4 is an exemplary plan view illustrating a part of an HGA according to a second embodiment.

FIG. 4 is an exemplary plan view illustrating a part of the HGA 37 according to the second embodiment. FIG. 5 is an exemplary cross-sectional view illustrating a part of the HGA 37 of the second embodiment taken along line F5-F5 of FIG. 4.

As illustrated in FIG. 4, the gimbal 45 of the second embodiment includes a movable part 200 instead of the movable part 62. The movable part 200 is substantially equal to the movable part 62 of the first embodiment except for the points described below.

The movable part 200 of the second embodiment includes a mount 201 and a pair of joining parts 202. Each of the mount 201 and the two joining parts 202 may have a part of the wiring layer 51 and a part of the backing layer 52.

The mount 201 is a part of the movable part 200 and has a mounting surface 81. The mounting surface 81 of the mount 201 has a plurality of pads 86. Terminals of the magnetic head 14 are joined to the plurality of pads 86 by solder 88. Further, the attachment surface 101 of the magnetic head 14 is attached to the mounting surface 81 by an adhesive 105.

The pair of joining parts 202 is a part of the movable part 200. The pair of joining parts 202 corresponds to the pair of rear edges 82. Further, each of the pair of joining parts 202 has a joining surface 205. The joining surface 205 is included in the surface 51a of the wiring layer 51. For example, an end of the joining surface 205 in the +Y direction is connected to the mounting surface 81 of the mount 201.

Figure 5:
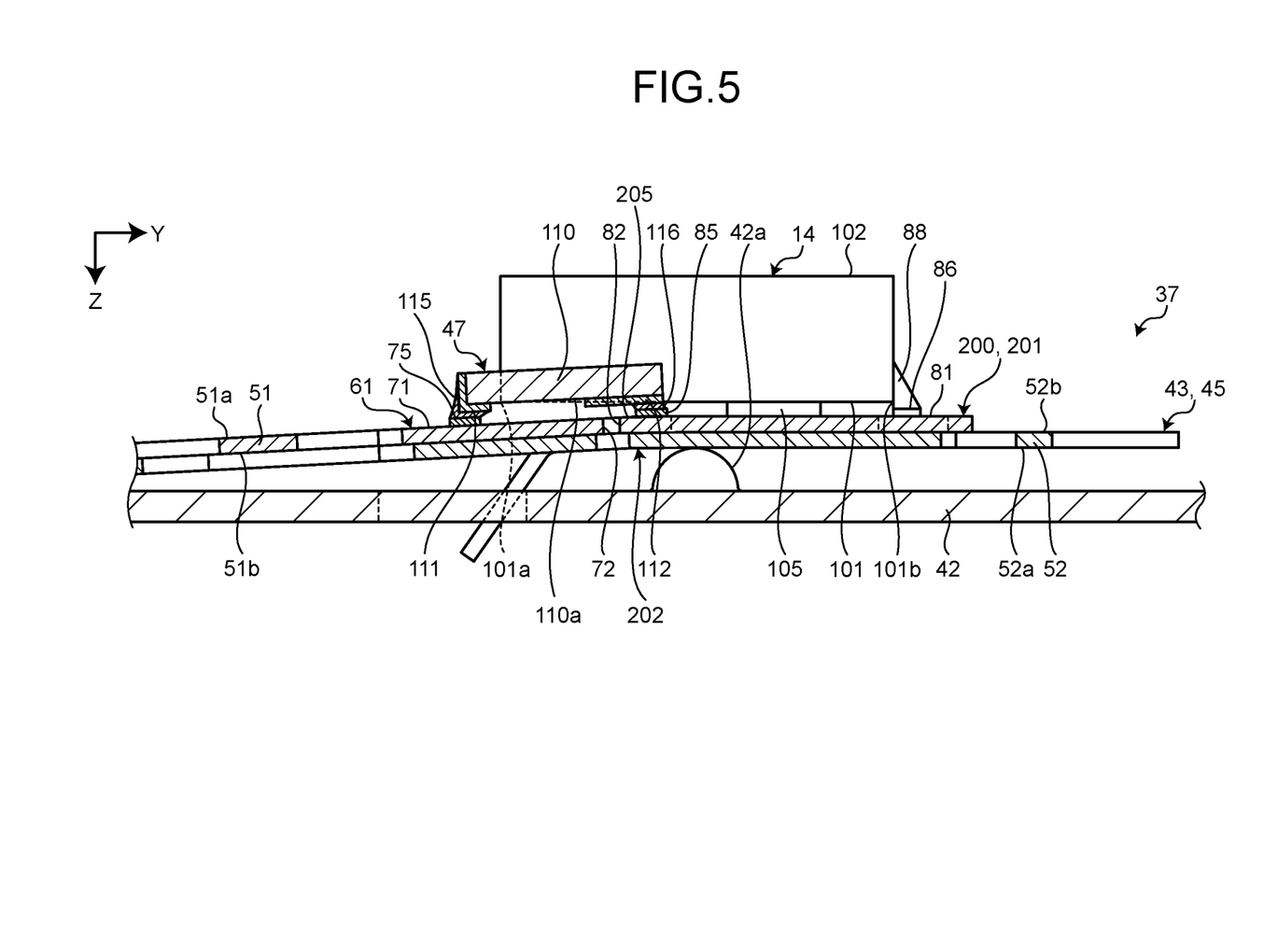
FIG. 5 is an exemplary cross-sectional view illustrating a part of the HGA of the second embodiment taken along line F5-F5 of FIG. 4.

As illustrated in FIG. 5, the joining surface 205 of the joining part 202 is inclined with respect to the mounting surface 81 such that the joining surface 205 extends further away from the attachment surface 101 of the magnetic head 14 as extending further away from the mounting surface 81. In the present embodiment, each of the pair of joining parts 202 is bent with respect to the mount 201 such that the joining surface 205 is inclined with respect to the mounting surface 81.

The joining surface 205 of the joining part 202 is inclined with respect to the mounting surface 81 so as to be approximately parallel to the mounting surface 71 of the base 61, for example. Because of this, the angle between the mounting surface 71 of the base 61 and the joining surface 205 of the joining part 202 is smaller than the angle between the mounting surface 71 and the mounting surface 81.

The joining surfaces 205 of the pair of joining parts 202 correspond to the pair of pads 85. The second electrode 112 of the MA 47 is joined to the pad 85 with an adhesive 116. In other words, the second electrode 112 is joined to the joining surface 205.

In the HDD 10 of the second embodiment described above, the movable part 200 has the joining surface 205. The joining surface 205 is inclined with respect to the mounting surface 81 in such a manner that the joining surface 205 extends further away from the attachment surface 101 as extending further away from the mounting surface 81. The second electrode 112 is joined to the joining surface 205. The angle between the mounting surface 71 and the joining surface 205 is smaller than the angle between the mounting surface 71 and the mounting surface 81. That is, the mounting surface 71 to which the first electrode 111 is joined and the joining surface 205 to which the second electrode 112 is joined are inclined with respect to the mounting surface 81 at smaller angles. As a result, the MA 47 can be easily joined to the flexure 43.

In the first embodiment and the second embodiment, the mounting surface 71 is inclined with respect to the mounting surface 81 by bending the base 61 with respect to the movable part 62. However, the mounting surface 71 is not limited to this example, and may be inclined with respect to the mounting surface 81, for example, by decreasing the thickness of the base 61 as the distance from the movable part 62 increases.

Third Embodiment

Figure 6:
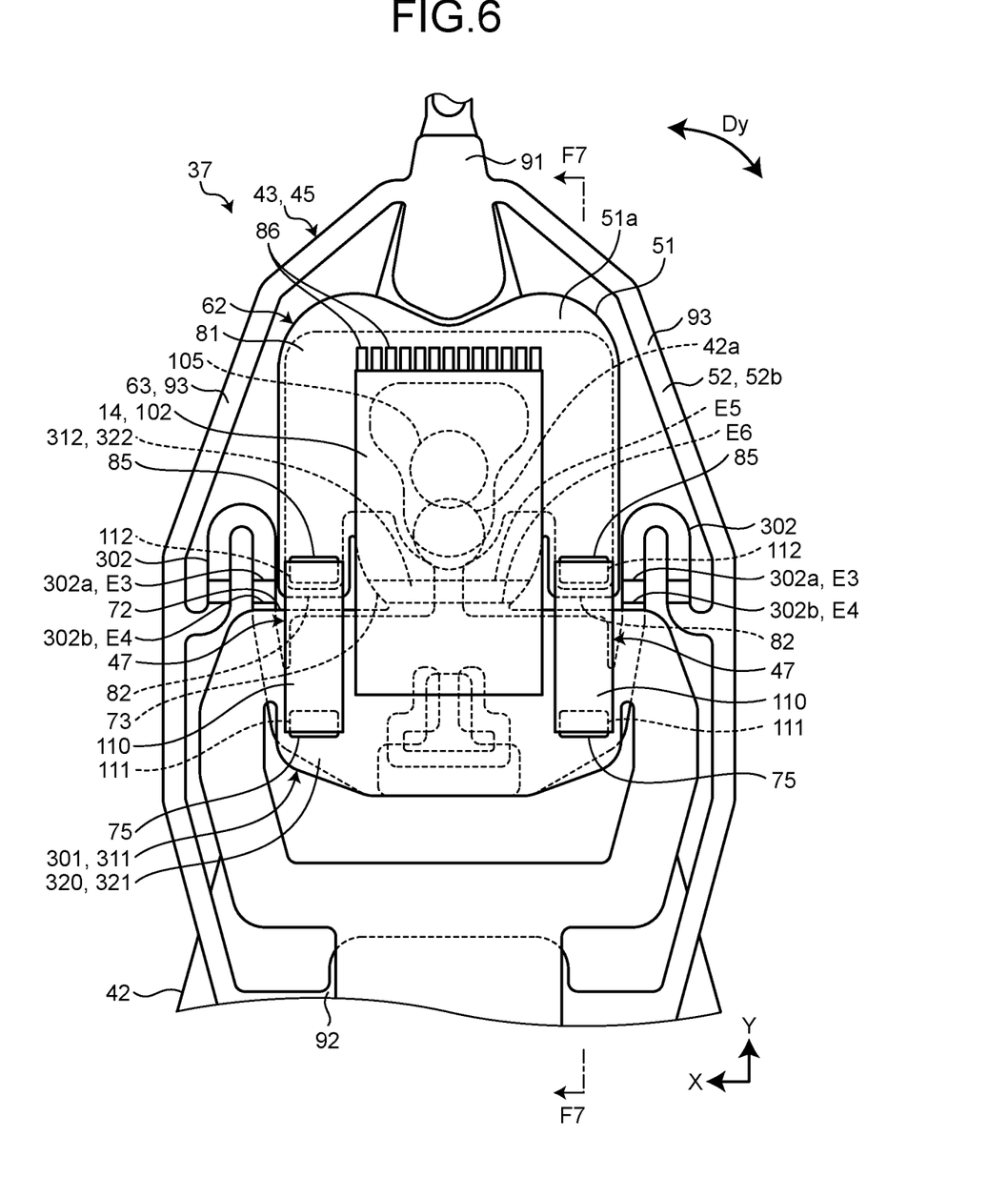
FIG. 6 is an exemplary plan view illustrating a part of an HGA according to a third embodiment.
Figure 7:
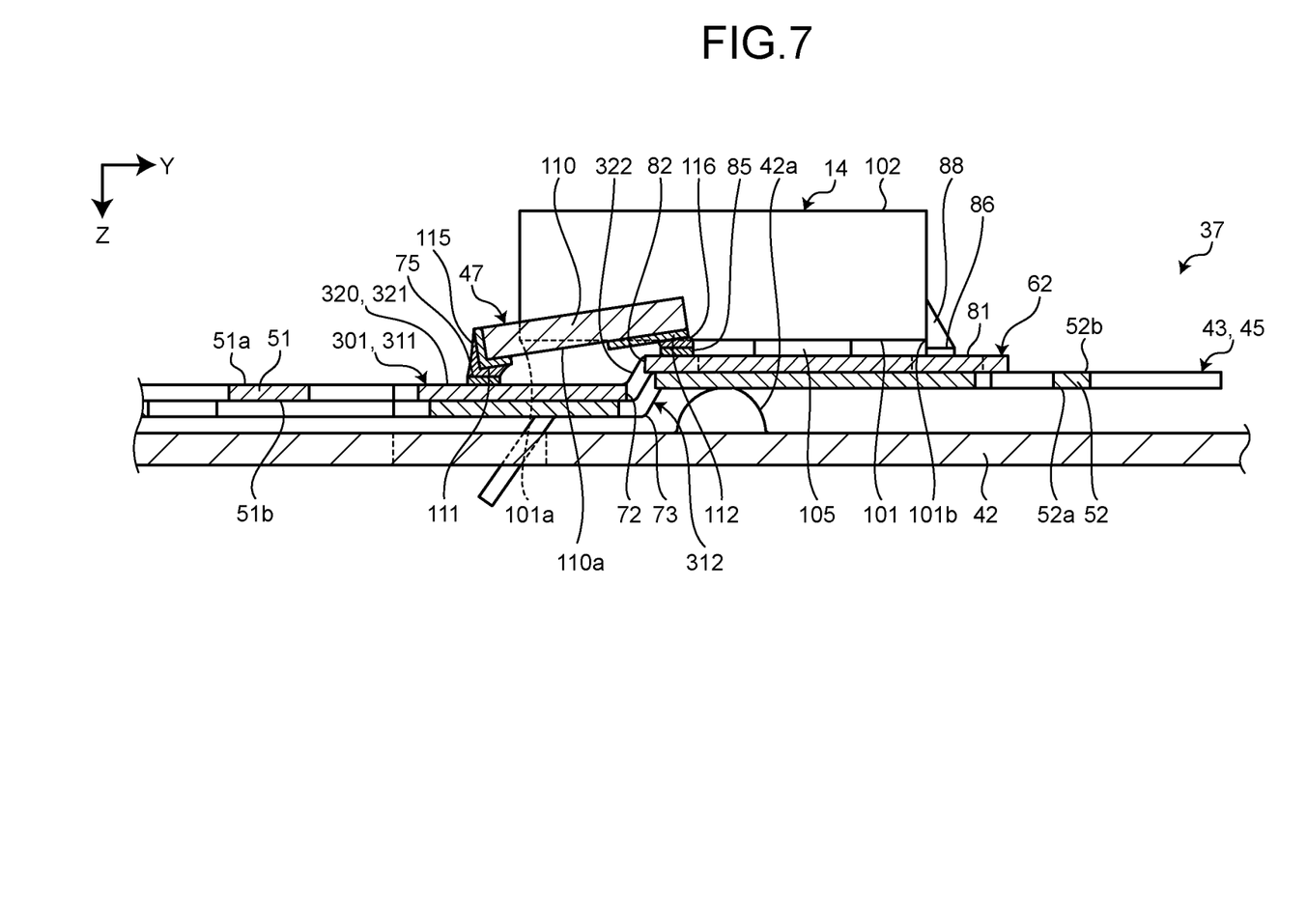
FIG. 7 is an exemplary cross-sectional view illustrating a part of the HGA of the third embodiment taken along line F7-F7 of FIG. 6.

Hereinafter, a third embodiment will be described with reference to FIGS. 6 and 7. FIG. 6 is an exemplary plan view illustrating a part of the HGA 37 according to the third embodiment. FIG. 7 is an exemplary cross-sectional view illustrating a part of the HGA 37 of the third embodiment taken along line F7-F7 of FIG. 6.

As illustrated in FIG. 6, the gimbal part 45 of the third embodiment has a base 301 instead of the base 61, and has a pair of connections 302 instead of the pair of connections 64. The base 301 and the connections 302 are substantially the same as the base 61 and the connections 64 of the first embodiment except for the points described below.

The base 301 includes a joining part 311 and an upward slope 312. The joining part 311 is an example of a part including a first joining surface, of the first part. The upward slope 312 is an example of a part of the first part where a first inclined surface is provided. Each of the joining part 311 and the upward slope 312 may have a part of the wiring layer 51 and a part of the backing layer 52.

The joining part 311 is part of the base 301 and has the front edge 72. The joining part 311 is bent with respect to the upward slope 312. The connection 302 connects the annular part 63 and the joining part 311 in a manner that the base 301 is swingable with respect to the annular part 63.

The upward slope 312 is a part of the base 301, and is located between the movable part 62 and the joining part 311. The upward slope 312 includes a flexible part 73. The upward slope 312 is bent with respect to the movable part 62.

The base 301 has a mounting surface 320 instead of the mounting surface 71. The mounting surface 320 is an example of a first surface. The mounting surface 320 is substantially the same as the mounting surface 71 of the first embodiment except as for the points described below. The mounting surface 320 has a joining surface 321 and an inclined surface 322. The joining surface 321 is an example of a first joining surface. The inclined surface 322 is an example of a first inclined surface.

The joining surface 321 is included in the joining part 311. The joining surface 321 includes a pair of pads 75. The first electrode 111 of the MA 47 is thus joined to the pad 75 included in the joining surface 321 with the adhesive 115. The joining surface 321 is substantially parallel to the mounting surface 81 of the movable part 62. As illustrated in FIG. 7, the joining part 311 extends substantially parallel to the movable part 62 and extends substantially parallel to the load beam 42. The joining part 311 is separated from the load beam 42.

The inclined surface 322 is included in the upward slope 312. The inclined surface 322 is thus located between the joining surface 321 including the pad 75 and the movable part 62. In the present embodiment, the inclined surface 322 is included in the flexible part 73. The inclined surface 322 may be included in a different part of the upward slope 312 other than the flexible part 73.

The inclined surface 322 is inclined with respect to the mounting surface 81 in such a manner that the inclined surface 322 extends further away from the attachment surface 101 of the magnetic head 14 as extending further away from the movable part 62. Because of this, the angle between the joining surface 321 and the mounting surface 81 is smaller than the angle between the inclined surface 322 and the mounting surface 81.

The upward slope 312 is bent with respect to the movable part 62 such that the inclined surface 322 is inclined with respect to the mounting surface 81. Further, the joining part 311 is bent with respect to the upward slope 312 such that the joining surface 321 is inclined with respect to the inclined surface 322. Note that the joining surface 321 and the inclined surface 322 are not limited to this example. For example, the joining surface 321 and the inclined surface 322 may be formed by partially decreasing the thickness of the base 301.

As illustrated in FIG. 6, each of the pair of connections 302 includes a first curved part 302a and a second curved part 302b. The edge E3 of the first curved part 302a and the edge E4 of the second curved part 302b both extend substantially in the X direction.

The edge E5 of a bend between the upward slope 312 and the movable part 62 is located on the extension line of the edge E3 of the first curved part 302a. In the Y direction, the edge E5 of the bend between the upward slope 312 and the movable part 62 and the edge E3 of the first curved part 302a are thus located at substantially the same position.

The edge E6 of the bend between the joining part 311 and the upward slope 312 is located on the extension line of the edge E4 of the second curved part 302b. In the Y direction, the edge E6 of the bend between the joining part 311 and the upward slope 312 and the edge E4 of the second curved part 302b are thus located at substantially the same position.

In the HDD 10 of the third embodiment described above, the mounting surface 320 includes the inclined surface 322 and the joining surface 321. The inclined surface 322 is inclined between the pad 75 and the movable part 62 with respect to the mounting surface 81 in such a manner that the inclined surface 322 extends further away from the attachment surface 101 as extending further away from the movable part 62. The joining surface 321 includes a pad 75. The angle between the joining surface 321 and the mounting surface 81 is smaller than the angle between the inclined surface 322 and the mounting surface 81. That is, the joining surface 321 having the pad 75 is formed approximately parallel to the mounting surface 81. As a result, the MA 47 can be easily joined to the flexure 43.

Of the base 301, the upward slope 312 including the inclined surface 322 is bent with respect to the movable part 62 such that the inclined surface 322 is inclined with respect to the mounting surface 81. Of the base 301, the joining part 311 including the joining surface 321 is bent with respect to the upward slope 312 such that the joining surface 321 is inclined with respect to the inclined surface 322. Such arrangement can facilitate the formation of the inclined surface 322 and the joining surface 321. Further, the joining part 311 can extend in the direction along the load beam 42. Thereby, the flexure 43 can be prevented from abutting on the load beam 42.

The flexure 43 includes the annular part 63 and the connection 302. The annular part 63 surrounds the base 301 and the movable part 62. The connection 302 connects the annular part 63 and the base 301 in a manner that the base 301 is swingable with respect to the annular part 63. The connection 302 includes the first curved part 302a and the second curved part 302b. The edge E5 of the bend between the upward slope 312 and the movable part 62 is located on the extension line of the edge E3 of the first curved part 302a. The edge E6 of the bend between the joining part 311 and the upward slope 312 is located on the extension line of the edge E4 of the second curved part 302b. That is, the corner between the base 301 and the movable part 62 is bent at substantially the same position as the first curved part 302a. In addition, the corner between the joining surface 321 and the inclined surface 322 is bent at substantially the same position as the second curved part 302b. As a result, the flexure 43 can prevent the connection 302 from applying, to the base 301, an elastic force that causes the bent base 301 to turn into a straight form.

Fourth Embodiment

Figure 8:
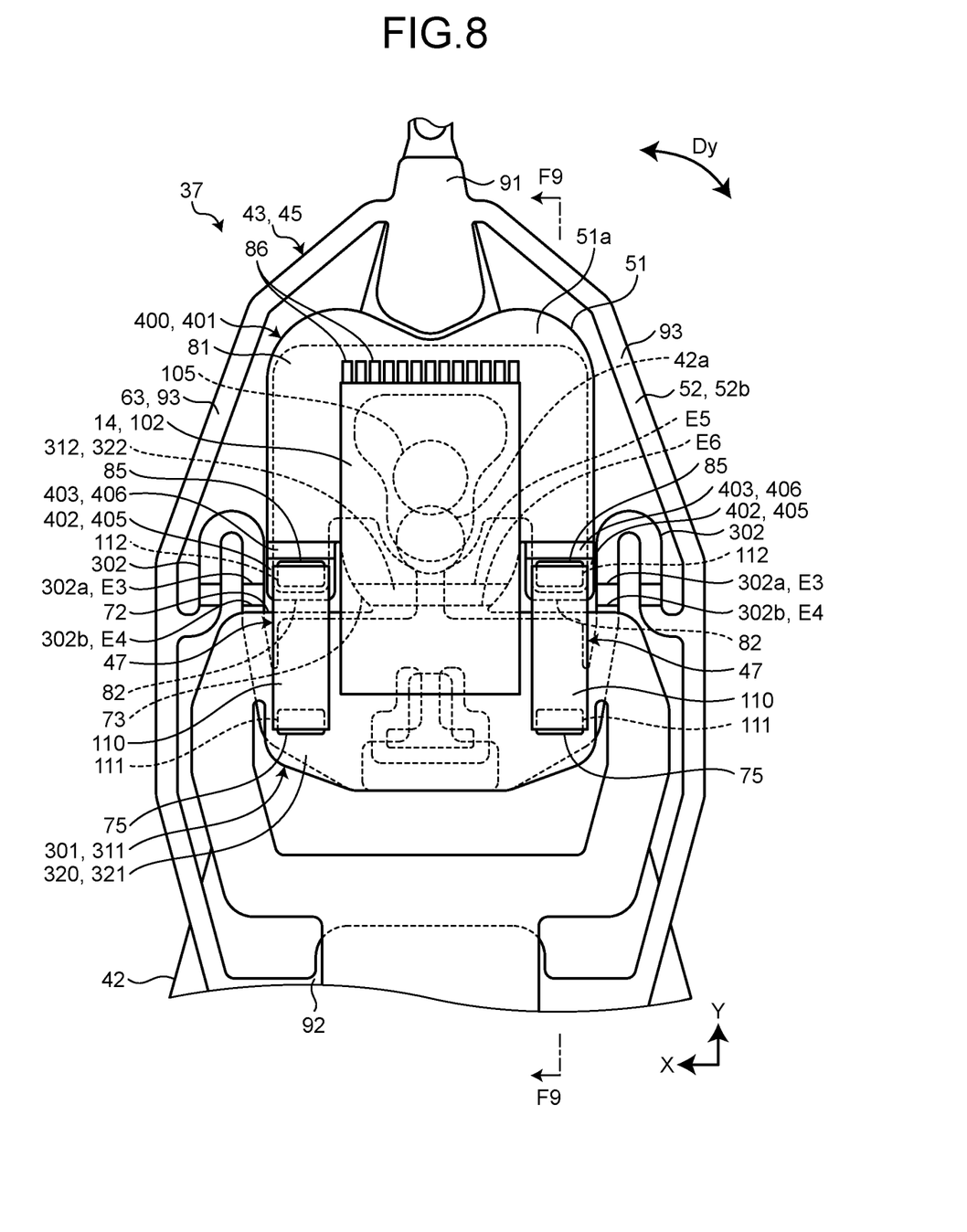
FIG. 8 is an exemplary plan view illustrating a part of an HGA according to a fourth embodiment.
Figure 9:
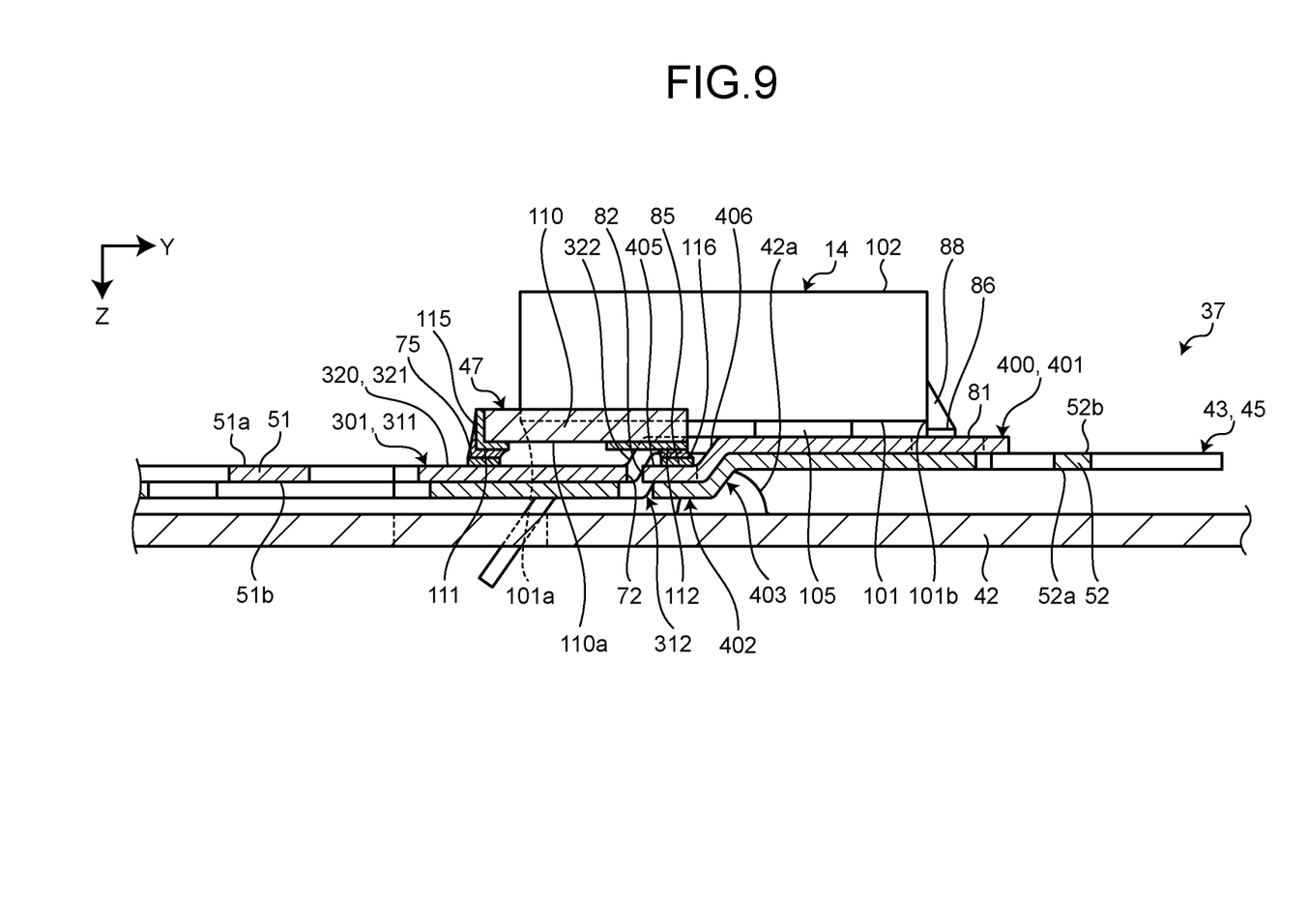
FIG. 9 is an exemplary cross-sectional view illustrating a part of the HGA of the fourth embodiment taken along line F9-F9 of FIG. 8.

Hereinafter, a fourth embodiment will be described with reference to FIGS. 8 and 9. FIG. 8 is an exemplary plan view illustrating a part of the HGA 37 according to the fourth embodiment. FIG. 9 is an exemplary cross-sectional view illustrating a part of the HGA 37 of the fourth embodiment taken along line F9-F9 of FIG. 8.

As illustrated in FIG. 8, the gimbal 45 of the fourth embodiment includes the base 301 and a pair of connections 302 as in the third embodiment. Further, the gimbal 45 of the fourth embodiment includes a movable part 400 instead of the movable part 62. The movable part 400 is substantially the same as the movable part 62 of the first embodiment except for the points described below.

The movable part 400 of the fourth embodiment includes a mount 401, a pair of joining parts 402, and a pair of upward slopes 403. Each of the mount 401, the pair of joining parts 402, and the pair of upward slopes 403 may have a part of the wiring layer 51 and a part of the backing layer 52.

The mount 401 is a part of the movable part 400 and has a mounting surface 81. The mounting surface 81 of the mount 401 has a plurality of pads 86. Terminals of the magnetic head 14 are joined to the plurality of pads 86 with solder 88. Further, the attachment surface 101 of the magnetic head 14 is attached to the mounting surface 81 with an adhesive 105.

The pair of joining parts 402 is a part of the movable part 400. Each of the pair of joining parts 402 has a corresponding one of the pair of rear edges 82. The joining part 402 is bent with respect to the upward slope 403.

The pair of upward slopes 403 is a part of the movable part 400. Each of the pair of upward slopes 403 is provided between the corresponding one of the pair of joining parts 402 and the mount 401. The upward slope 403 is bent with respect to the mount 401.

Each of the pair of joining parts 402 has a joining surface 405. The joining surface 405 is an example of a second joining surface. The joining surface 405 is included in the surface 51a of the wiring layer 51. The joining surfaces 405 of the pair of joining parts 402 correspond to the pair of pads 85. Thus, the second electrode 112 of the MA 47 is joined to the pad 85 included in the joining surface 405 with the adhesive 116.

As illustrated in FIG. 9, the joining surface 405 is substantially parallel to the mounting surface 81. Therefore, the joining part 402 extends substantially parallel to the mount 401 and extends substantially parallel to the load beam 42. The joining part 402 is separated from the load beam 42.

In the Z direction orthogonal to the mounting surface 81, the joining surface 321 of the base 301 and the joining surface 405 of the movable part 400 are disposed at substantially the same position. In other words, the joining surfaces 321 and 405 are disposed on the same plane. In the Z direction, thus, the distance between the joining surface 321 and the joining surface 405 is shorter than the distance between the joining surface 405 and the mounting surface 81.

Each of the pair of upward slopes 403 has an inclined surface 406. The inclined surface 406 is an example of a second inclined surface. The inclined surface 406 is located between the mounting surface 81 and the joining surface 405. For example, an end of the inclined surface 406 in the +Y direction is connected to the mounting surface 81. An end of the inclined surface 406 in the −Y direction is connected to the joining surface 405.

The inclined surface 406 is inclined with respect to the mounting surface 81 such that the inclined surface 406 extends further away from the attachment surface 101 of the magnetic head 14 as extending further away from the mounting surface 81. Because of this, the angle between the joining surface 405 and the mounting surface 81 is smaller than the angle between the inclined surface 406 and the mounting surface 81.

The first electrode 111 is joined to the joining surface 321 of the base 301, and the second electrode 112 is joined to the joining surface 405 of the movable part 400. As a result, the MA 47 is disposed such that the attachment surface 110a is substantially parallel to the mounting surface 81.

In the Y direction, the position of the inclined surface 322 of the base 301 and the position of the inclined surface 406 of the movable part 400 are different from each other. In the present embodiment, in the Y direction, the inclined surface 406 is separated from the inclined surface 322 in the +Y direction.

In the HDD 10 of the fourth embodiment described above, the movable part 400 has the joining surface 405 and the inclined surface 406. The second electrode 112 is joined to the joining surface 405. The inclined surface 406 is inclined between the mounting surface 81 and the joining surface 405 with respect to the mounting surface 81 such that the inclined surface 406 extends further away from the attachment surface 101 as extending further away from the mounting surface 81. The angle between the joining surface 405 and the mounting surface 81 is smaller than the angle between the inclined surface 406 and the mounting surface 81. In the Z direction orthogonal to the mounting surface 81, the distance between the joining surface 321 and the joining surface 405 is shorter than the distance between the joining surface 405 and the mounting surface 81. Namely, the joining surface 405 is formed approximately parallel and closer (in height) to the joining surface 321 in the Z direction. As a result, the MA 47 can be easily joined to the flexure 43.

In the above description, "to prevent (to be prevented)" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a magnetic disk;
a magnetic head configured to read and write information from and to the magnetic disk;
a piezoelectric element including a first electrode and a second electrode spaced apart from the first electrode; and
a flexure including
a first part to which the first electrode is joined, and
a second part to which the magnetic head and the second electrode are joined, the second part that swings with respect to the first part by deformation of the piezoelectric element which changes a distance between the first electrode and the second electrode, wherein
the first part has a first surface to which the first electrode is joined,
the second part has a second surface to which the magnetic head is joined,
the magnetic head has a third surface facing the first surface and the second surface,
the first electrode is spaced apart from the second electrode in a first direction along the second surface,
the first surface and an end of the third surface in the first direction face each other,
the second surface and an end of the third surface in a second direction opposite to the first direction face each other, and
a distance between the first surface and the end of the third surface in the first direction is longer than a distance between the second surface and the end of the third surface in the second direction.

2. The disk device according to claim 1, wherein
the first surface includes a pad to which the first electrode is joined, and
of the first surface, at least a part between the pad and the second part is inclined with respect to the second surface such that the part extends further away from the third surface as extending further away from the second part.

3. The disk device according to claim 2, wherein
the first surface is inclined with respect to the second surface in-between the pad and the second part and in the pad such that the first surface extends further away from the third surface as extending further away from the second part.

4. The disk device according to claim 3, wherein
the first part is bent with respect to the second part such that the first surface is inclined with respect to the second surface.

5. The disk device according to claim 4, wherein
the flexure includes
an annular part surrounding the first part and the second part, and
a connection connecting the annular part and the first part in a manner that the first part is swingable with respect to the annular part,
the connection includes a curved part, and
an edge of a bend between the first part and the second part is located on an extension line of an edge of the curved part.

6. The disk device according to claim 3, wherein
the second part has a joining surface being inclined with respect to the second surface such that the joining surface extends further away from the third surface as extending further away from the second surface,
the second electrode is joined to the joining surface, and
an angle between the first surface and the joining surface is smaller than an angle between the first surface and the second surface.

7. The disk device according to claim 2, wherein
the first surface includes
a first inclined surface inclined between the pad and the second part with respect to the second surface such that the first inclined surface extends further away from the third surface as extending further away from the second part, and
a first joining surface including the pad, and
an angle between the first joining surface and the second surface is smaller than an angle between the first inclined surface and the second surface.

8. The disk device according to claim 7, wherein
of the first part, a part including the first inclined surface is bent with respect to the second part such that the first inclined surface is inclined with respect to the second surface, and
of the first part, a part including the first joining surface is bent with respect to the part including the first inclined surface such that the first joining surface is inclined with respect to the first inclined surface.

9. The disk device according to claim 8, wherein
the flexure includes
an annular part surrounding the first part and the second part, and
a connection connecting the annular part and the first part in a manner that the first part is swingable with respect to the annular part,
the connection includes a first curved part and a second curved part,
an edge of a bend between the part including the first inclined surface and the second part is located on an extension line of an edge of the first curved part, and
an edge of a bend between the part including the first joining surface and the part including the first inclined surface is located on an extension line of an edge of the second curved part.

10. The disk device according to claim 7, wherein
the second part includes
a second joining surface to which the second electrode is joined, and
a second inclined surface being inclined between the second surface and the second joining surface with respect to the second surface such that the second inclined surface extends further away from the third surface as extending further away from the second surface,
an angle between the second joining surface and the second surface is smaller than an angle between the second inclined surface and the second surface, and
a distance between the first joining surface and the second joining surface is shorter than a distance between the second joining surface and the second surface in a direction orthogonal to the second surface.

11. The disk device according to claim 1, wherein
the second electrode is joined to the second surface,
the piezoelectric element has an attachment surface on which the first electrode and the second electrode are mounted, and the attachment surface is inclined with respect to the second surface.

12. The disk device according to claim 1, wherein
the second part is connected to the first part swingably with respect to the first part,
the first part has a first edge,
the second part has a second edge apart from the first edge in the second direction along the second surface, and
the piezoelectric element extends across the first edge and the second edge.

13. The disk device according to claim 1, further comprising:
an actuator that rotates the flexure about a rotation axis, wherein
an end of the third surface in the first direction is closer to the rotation axis than an end of the third surface in the second direction.

* * * * *